United States Patent [19]
Hohler et al.

[11] 3,842,543
[45] Oct. 22, 1974

[54] GRINDING MACHINE

[75] Inventors: Frederick A. Hohler, Holden; Edmund E. Wlodyka, Saxonville, both of Mass.

[73] Assignee: The Heald Machine Company, Worcester, Mass.

[22] Filed: Apr. 13, 1972

[21] Appl. No.: 243,832

Related U.S. Application Data
[63] Continuation of Ser. No. 85,777, Oct. 30, 1970, abandoned, and a continuation of Ser. No. 710,123, March 4, 1968, abandoned.

[52] U.S. Cl. .................. 51/5, 51/105 R, 51/291
[51] Int. Cl. ....... B24b 7/00, B24b 9/00, B24b 17/00
[58] Field of Search ............ 51/5, 103, 105, 165.14, 51/165.15, 291; 125/11.2, 39

[56] References Cited
UNITED STATES PATENTS

| | | | |
|---|---|---|---|
| 3,089,291 | 5/1963 | Humes et al. ..................... | 51/103 R |
| 3,314,410 | 4/1967 | Knauer et al. .................... | 125/11 R |
| 3,347,219 | 10/1967 | Wellborn ......................... | 125/39 X |

*Primary Examiner*—James L. Jones, Jr.
*Attorney, Agent, or Firm*—Norman S. Blodgett; Gerry A. Blodgett

[57] ABSTRACT

This invention relates to a grinding machine, and more particularly, to a machine for forming annular surfaces of revolution of irregular form.

6 Claims, 5 Drawing Figures

PATENTED OCT 22 1974

INVENTORS
FREDERICK A. HOHLER
BY EDMUND E. WLODYKA

*Norman S. Blodgett*

ATTORNEY

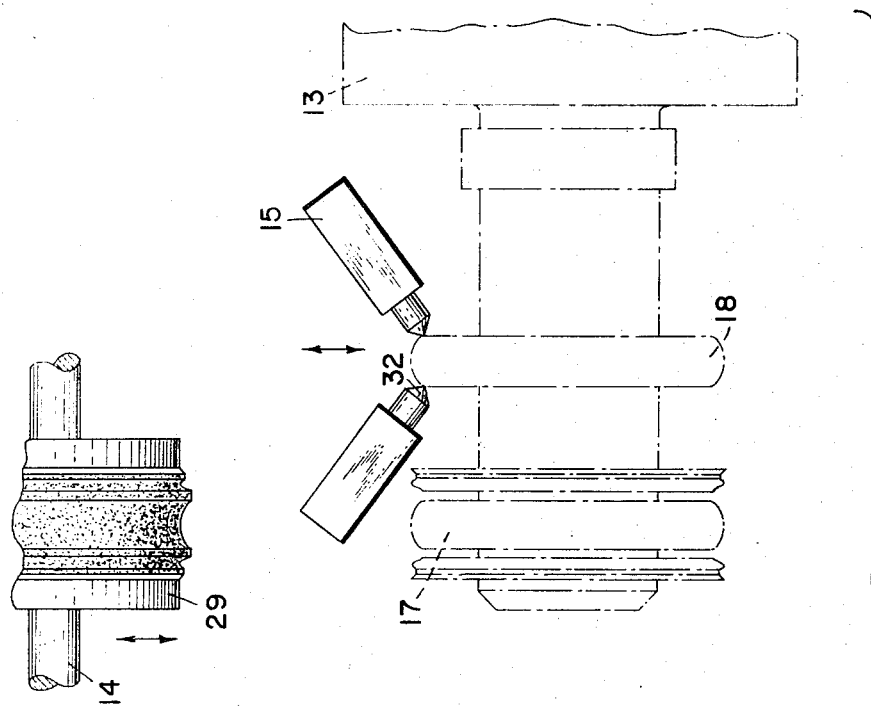
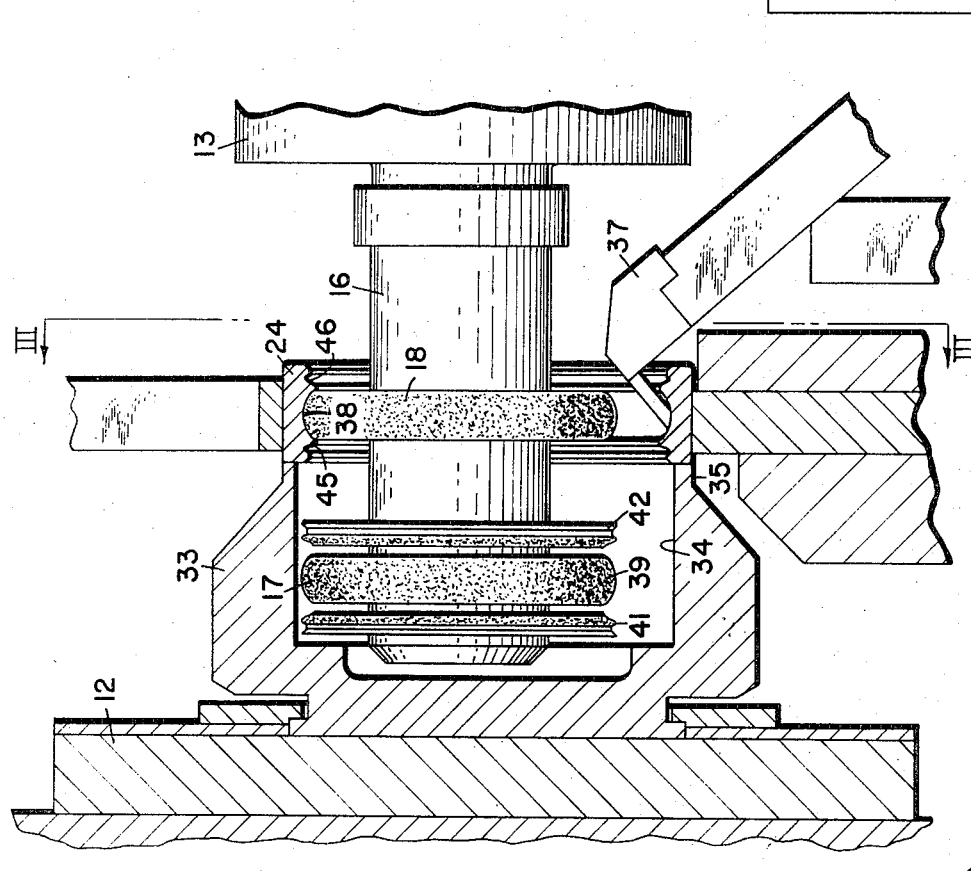
FIG. 2

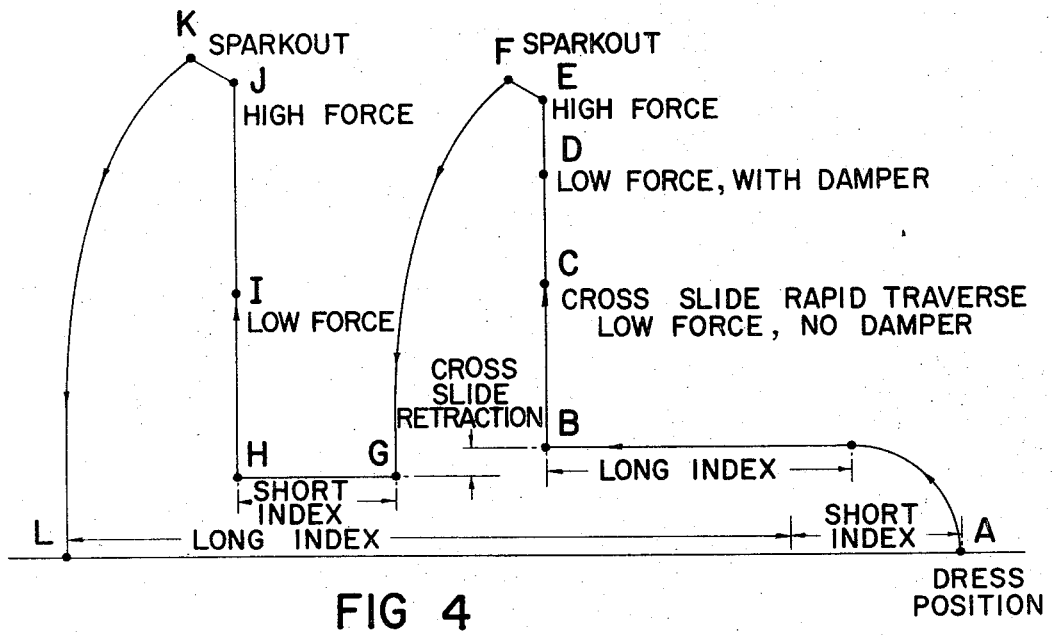
FIG 4
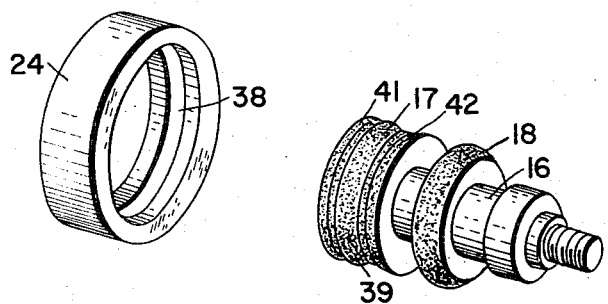
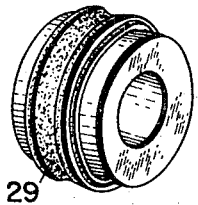
FIG 5

3,842,543

GRINDING MACHINE

This application is a continuation of Ser. No. 85,777, filed Oct. 30, 1970, and a continuation of Ser. No. 710,123, filed March 4, 1968, both now abandoned.

BACKGROUND OF THE INVENTION

In the manufacture of machine elements having complex surfaces of revolution, such as ball bearing races, it has been customary to rough out the surface on a screw machine, to heat treat the race, and then to grind the ball track. One of the difficulties of this procedure is that the number of times that the workpiece must be handled, i.e., introduced and removed from a machine tool and transported from one machine to another. Furthermore, the heat treatment tends to distort the workpiece and to upset any precise geometric relationship that might have existed between the parts of the surface. To restore such relationships, it is necessary not only to grind the important part of the surface (ball track) but the other surfaces also (seal grooves). The excessive handling and the multiplicity of machining operations cause the finished cost of the workpiece to be quite high. These and other difficulties experienced with the prior art devices have been obviated in a novel manner by the present invention.

It is, therefore, an outstanding object of the invention to provide a grinding machine for forming any contoured surface of revolution on a rough workpiece.

Another object of this invention is the provision of a grinding machine for producing the roller track and seal groove on a bearing race directly from a blank bushing.

A further object of this invention is the provision of a grinding machine for plunge grinding the ball track and seal grooves on a ball bearing race in an uninterrupted operation.

It is another object of the instant invention to provide a grinding machine for plunge grinding a complex internal surface of revolution very accurately despite severe stock removal.

A still further object of the invention is the provision of a grinding machine for abrasive machining of contoured surfaces of revolution with excellent repeatability of geometry and finish.

With these and other objects in view, as will be apparent to those skilled in the art, the invention resides in the combination of parts set forth in the specification and covered by the claims appended hereto.

SUMMARY OF THE INVENTION

In general, the present invention consists of a grinding machine having a workhead for holding and rotating a workpiece having a portion which is to be formed with a surface of revolution of contoured form and a wheelhead for holding and rotating an abrasive wheel having a surface of the same contoured form. A feed means is provided to move the workhead and wheelhead relative to one another to introduce the abrasive wheel to the workpiece for a grinding operation with a predetermined sequence of controlled forces. A dresser having an operative surface of the same contoured form is located adjacent the workhead and wheelhead and means is provided to introduce the abrasive wheel to the dresser for introducing the abrasive wheel accurately to the said contoured form after the said plunge grind. The abrasive wheel during the dressing operation is rotated at its normal high grinding speed and the dresser is rotated in the opposite direction.

More specifically, the wheelhead carries the first above-mentioned abrasive wheel and a second abrasive wheel, the two wheels are in axially-spaced relationship, and a second dresser for dressing the second abrasive wheel is spaced axially from the first above-mentioned dresser. The first dresser is provided with a wheel having the said surface of revolution of contoured form, the wheel being rotated about the major axis of the surface of revolution and the wheel consisting of a matrix in which are embedded a number of diamonds.

In the specific embodiment, the surface of the workpiece to be finished in an internal surface of revolution and the workhead is provided with a platen which contacts a radial surface of the workpiece for driving the same. The spindle is supported at one end only by the wheelhead and the platen is provided with a large axial recess to receive one of the abrasive wheels while the other is operating on the workpiece.

BRIEF DESCRIPTION OF THE DRAWINGS

The character of the invention, however, may be best understood by reference to one of its structural forms, as illustrated by the accompanying drawings, in which:

FIG. 2 is a horizontal sectional view of a portion of the invention, FIG. 4 is a diagram showing a machining cycle which is used with the invention, and FIG. 5 is a perspective view of several important elements of the machine.

DESCRIPTION OF THE PREFERRED EMBODIMENT

Figure 1:
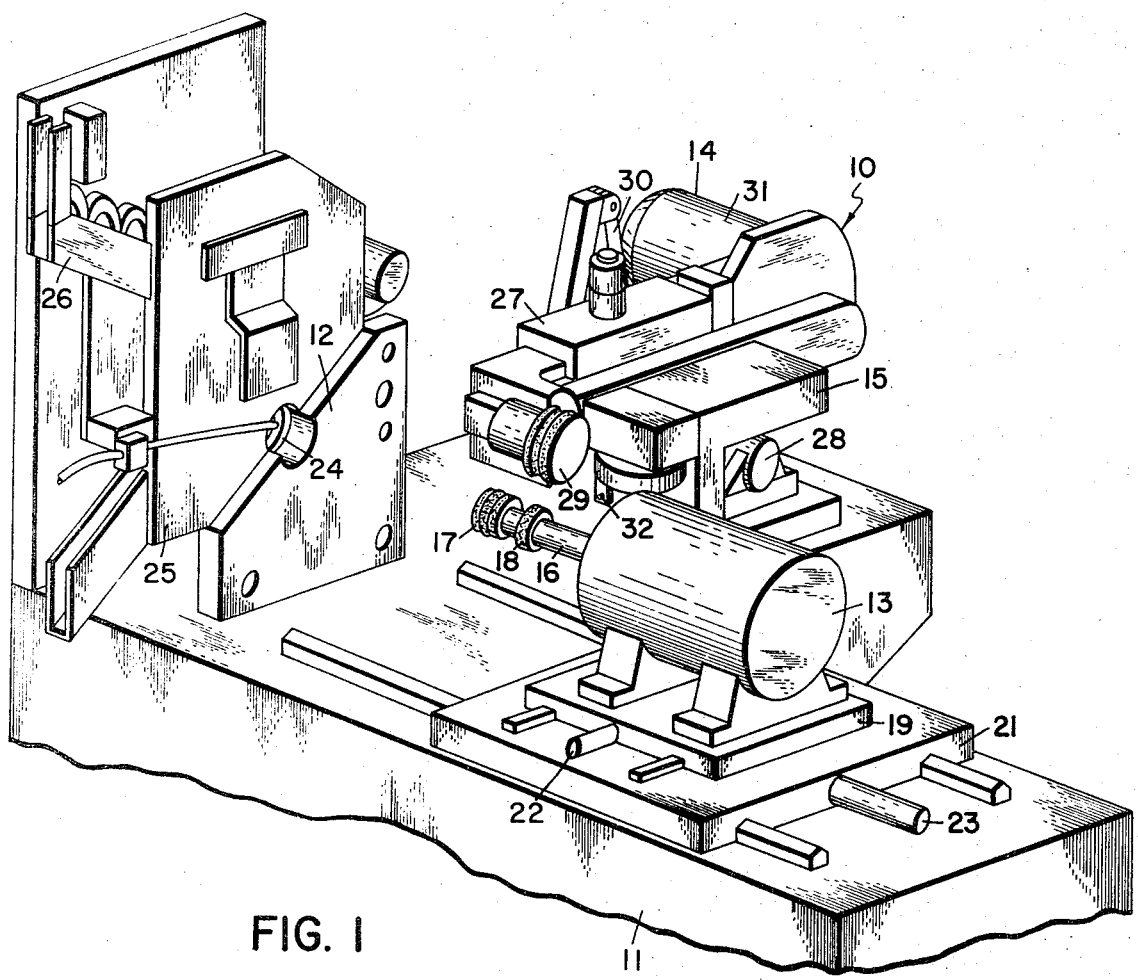
FIG. 1 is a perspective view of a grinding machine embodying the principles of the present invention.

Referring first to FIG. 1, which best shows the general features of the invention, the grinding machine, indicated generally by the reference numeral 10, is shown as consisting of a base 11 on which is mounted a workhead 12 and a wheelhead 13. Also mounted on the base is a first dresser 14 and a second dresser 15.

The wheelhead 13 is provided with a rotatable spindle 16 on which is mounted a first abrasive wheel 17 and a second abrasive wheel 18. The wheelhead is mounted on a cross-slide table 19 which, in turn, is mounted for transverse sliding motion (perpendicular to the spindle axis) on a traverse table 21. This table is mounted on the base for motion lengthwise of the spindle 16. The wheelhead is movable transversely by a cylinder 22 lying between the table 19 and table 21 in the manner shown and described in the patent application of Uhtenwoldt Ser. No. 451,712, filed April 29, 1965. A cylinder 23 operates between the table 21 and the base 11 to move the wheelhead longitudinally of the spindle. Suitable wellknown controls, not shown, are provided to energize the cylinders to cause transverse and longitudinal movements of the spindle and abrasive wheels in grinding cycle, as will be described hereinafter.

The workhead 12 supports a workpiece 24 for rotation and an automatic loading mechanism 25 is provided for introducing the workpieces to the work area and removing them after grinding. The workpieces advance in queue along an entrance chute 26.

The first dresser 14 has an elongated body 27 which is pivotally mounted on the base by means of journals 28 for swinging movement about an axis parallel to the workpiece axis. An actuator 30 is provided to bring about this movement. A dressing wheel 29 at the inner end of the dresser is rotatably driven by a motor 31 located at the outer end. The second dresser 15 is of the type which moves a diamond 32 in an arc around a wheel to generate an annular surface; such a dresser is shown and described in the copending patent application of Uhtenwoldt Ser. No. 590,884, filed Oct. 31, 1966.

Figure 3:
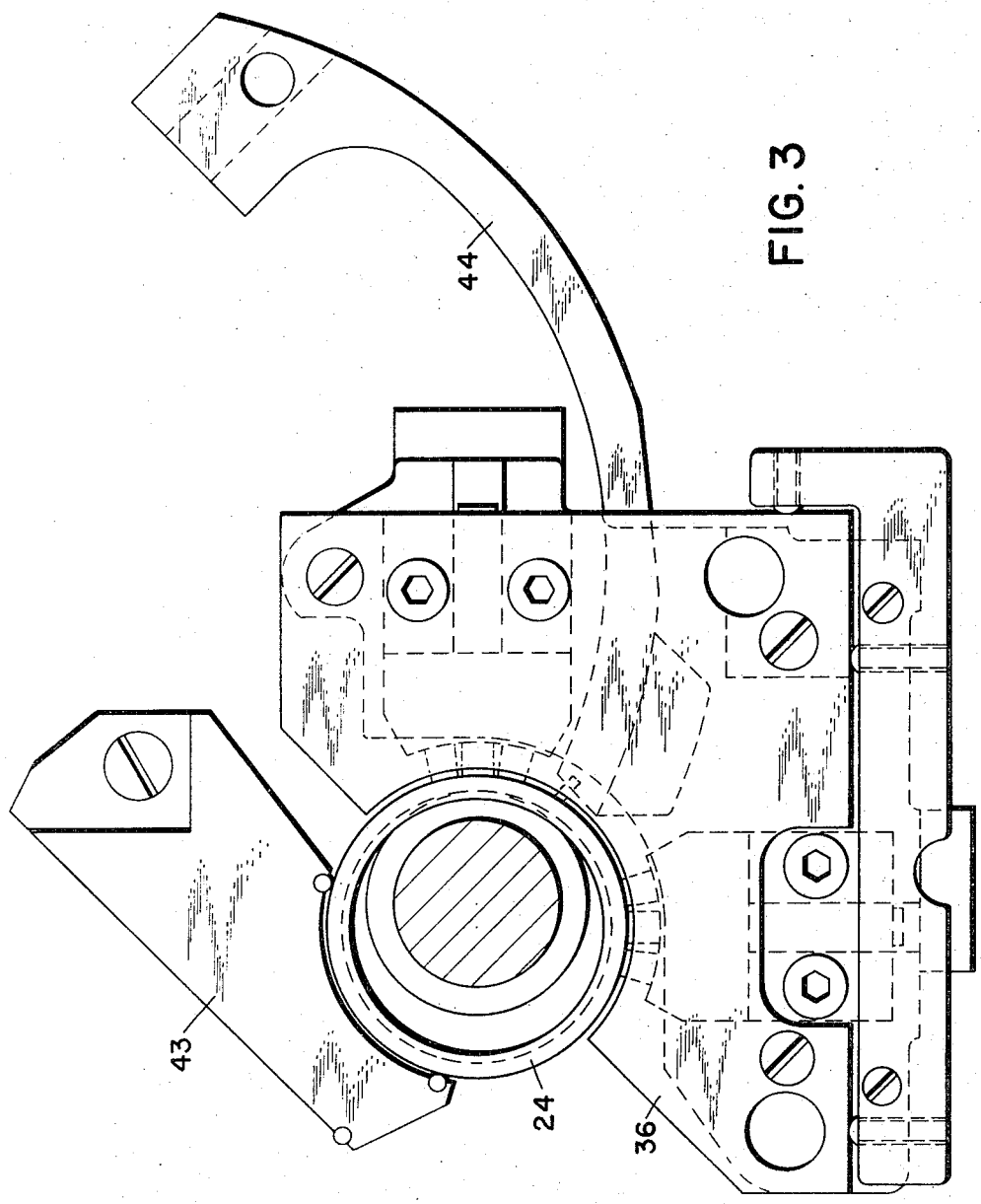
FIG. 3 is a vertical sectional view of the invention taken on the line III—III of FIG. 2.

FIGS. 2 and 3 show the geometrical relationships between the elements of the machine 10. The workhead 12 has a drive platen 33 with a recess 34 defining an axially-extending lip 35 which engages and transmits rotative power to the workpiece 24. The outer periphery of the workpiece is supported on the conventional fixed shoe 36. Mounted on the machine adjacent the workhead is a single-finger gage 37. The wheelhead is movable in the direction of the axis of the workpiece and the axis of the spindle 16 to carry the abrasive wheels 17 and 18 to various positions. In addition, means is provided to bring about relative lateral movement between the wheels 17 and 18 on the one hand and the workhead 12, workpiece 24, dresser 14, and dresser 15 on the other hand. For instance, in FIG. 2, the finish or second wheel 18 is located to finish the ball groove 38 of the workpiece which, for example, is shown as the outer race of a ball bearing. In this condition, the rough or first wheel 18 is located in the recess 34. As is evident in the drawing, the first wheel consists of a center portion 39 and two seal groove portions 41 and 42. At the dotted position to the right, the first wheel 18 is located to engage the dressing wheel 29, while the second wheel is located to engage the dressing diamond 32.

In FIG. 3, it can be seen that the workpiece 24 is supported at 3 o'clock and 6 o'clock by the shoes 36 and held in place by a work locator 43. An ejector 44 is provided to intrude at about 4 o'clock between the supports to remove the workpiece from the shoes after the grinding operation has been completed. Suitable adjustments are provided to locate the workpiece in the proper eccentric relationship to the platen 33 to drive the workpiece firmly into the supports in the usual way during grinding.

FIG. 4 shows the cycle of relative movements between the spindle 16 and its abrasive wheels 17 and 18 on the one hand and the workpiece, workhead, and dressers on the other hand. With the wheels withdrawn at the extreme right and extreme forward position, point A. The wheelhead moves axially toward the workpiece by an amount equal to the extreme throws of a cylinder (LONG INDEX) to a point B. At that point, the center portion 39 of the wheel 17 is lined up with the ball groove 38 of the workpiece. The wheelhead moves laterally for a plunge grinding operation. The first part of the crossfeed (to the point C) takes place at a fast rate with low force hydraulic pressure in the crossfeed cylinder and no damper is used on the motion. The second stage of crossfeed from point C to point D at low force with a damper and, finally, the feed from point D to the point E takes place at high force, followed by a sparkout to the point F. At the same time that the ball groove 38 is being rough ground, the seal groove wheels are producing seal grooves 45 and 46. This plunge grind on the seal grooves is sufficiently accurate in size and geometry and in smoothness of finish to satisfy the tolerances needed for such grooves. The wheelhead and wheels retract laterally to point G which is further forward (toward the front of the machine) by an amount called the "cross slide retraction." The next motion of the wheelhead is axially of the workpiece to a point H. The length of this motion is determined by a SHORT INDEX cylinder and the finish wheel 18 is brought into registry with the ball groove. At that stage of the cycle, the wheel 17 resides in the recess 34, which is the condition shown in FIG. 2. The wheel is then moved laterally with low force to the point I and, then, at high force to the point J, followed by a sparkout to the point K. This completes the finish grinding of the ball track or groove. The wheel is retracted laterally to the point L and then axially to the point A again. The movement from the point L to point A represents the sum of the extreme motions produced by the two cylinders, i.e., LONG INDEX plus SHORT INDEX.

At the point A, the two wheels are dressed. Because the wheels 17 and 18 are separated a considerable distance, the dressers 14 and 15 can operate on their wheels 17 and 18, respectively, without moving the wheelhead axially. First, the dresser 14 pivots about its journals 28 by the operation of the actuator 30 to bring the dressing wheel 29 down into contact with the wheel 17, high pressure coolant being provided at that time. The dressing wheel is rotated in a first direction by its motor 31 and the wheel 17 is rotated at its normal high speed in the opposite direction; the relative surface speed between the two produces the restoration of the shape and sharpness of the center portion 39 of the wheel 17 as well as the seal groove wheels 41 and 42. After this dressing operation has been completed, the dresser 15 is swung downwardly to bring the diamond 32 into operative relation to the finish wheel 18. The diamond is moved in an arc around the wheel to produce the desired geometry and restoration of sharpness. Usually, the shape desired will be an annulus of circular cross-section and, for that purpose, the diamond is moved through a circular arc in a plane passing through the axis of the spindle. Normally, the changing of workpieces takes place during these dressing operations, so that the actual grinding operation occupies as large a part of the machine cycle as possible.

FIG. 5 shows in perspective a typical set of tools for providing the ball track 38 and the seal grooves for a workpiece 24 in the nature of an outer bearing race. The abrasive wheel 17 is mounted on its own spindle 16, along with the finish wheel 18. The wheel 17 has an annular central portion 39 on the seal groove portions 41 and 42. The special dressing wheel 29 has an outer periphery accurately shaped to restore geometry and sharpness to the wheel 17. This dressing wheel consists of a matrix (possibly of sintered copper powder) in which are embedded a large number of diamonds. This forms a practically indestructible surface that will retain its geometrical form and its ability to accurately dress (or machine) the contoured surface of the abrasive wheel for a considerable length of time.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine, comprising
   a. a workhead for holding and rotating a workpiece having a portion which is to be formed with a surface of revolution of non-cylindrical form,
   b. a wheelhead for holding and rotating a first abrasive wheel having a surface of the same non-cylindrical form and a second abrasive wheel, the two wheels being in axially spaced relationship, the surface of the second abrasive wheel duplicating a special portion of the surface of the first abrasive wheel, which portion is to be finished with a better quality than the remainder,
   c. feed means to move the workhead and wheelhead relative to one another to introduce the abrasive wheel to the workpiece for a plunge grind with a predetermined controlled force,
   d. a dresser having an operative surface of the same non-cylindrical form located adjacent the workhead and wheelhead, the dresser being provided with a wheel having a surface of revolution of non-cylindrical form similar to that of the wheel, the wheel being rotatably driven about the major axis of the surface of revolution, the wheel consisting of a matrix in which are embedded a number of diamonds,
   e. a second dresser axially spaced from the first abovementioned dresser for dressing the second abrasive wheel, and
   f. means serving to introduce the rotating abrasive wheel to the dresser while rotating the dresser in the opposite direction to that of the wheel for restoring the abrasive wheel accurately to the said non-cylindrical form after the said plunge grind.

2. A grinding machine as recited in claim 1, wherein the wheelhead has a spindle on which the said abrasive wheel is mounted, wherein the first wheel consists of a plurality of individual wheels mounted close together, including a large annular ball track wheel between two thin seal groove wheels.

3. A grinding machine as recited in claim 1, wherein the surface of the workpiece to be finished is an internal surface of revolution, wherein the workhead is provided with a platen which contacts a radial surface of the workpiece for driving the same, wherein the spindle is supported at one end only by the wheelhead, and wherein the platen is provided with a large axial recess to receive one of the abrasive wheels while the other is operating on the workpiece.

4. A grinding machine as recited in claim 3, wherein the second abrasive wheel is located on the spindle at a position occupied by the first abrasive wheel and wherein it is the said first abrasive wheel which resides on occasion in the recess in the platen.

5. A grinding machine as recited in claim 4, wherein the said second dresser is a radius dresser and wherein the two dressers are mounted side-by-side and are individually retractable away from the path of longitudinal movement of the wheels.

6. A grinding machine as recited in claim 5, wherein a substantial portion of the first abrasive wheel is a portion of an annulus of circular cross-section for rough forming a ball track on a ball bearing race and the second abrasive wheel is of the same shape for finishing the ball track.

* * * * *